(12) United States Patent
Stangelmayer et al.

(10) Patent No.: US 11,105,734 B2
(45) Date of Patent: Aug. 31, 2021

(54) METHOD FOR CALIBRATED OPTICAL MEASUREMENT AND SYSTEM THEREFOR

(71) Applicant: PreSens Precision Sensing GmbH, Regensburg (DE)

(72) Inventors: Achim Stangelmayer, Neuburg an der Donau (DE); Gregor Liebsch, Obertraubling (DE); Robert J. Meier, Nittendorf (DE)

(73) Assignee: PreSens Precision Sensing GmbH, Regensburg (DE)

(*) Notice: Subject to any disclaimer, the term of this patent is extended or adjusted under 35 U.S.C. 154(b) by 309 days.

(21) Appl. No.: 16/275,929

(22) Filed: Feb. 14, 2019

(65) Prior Publication Data

US 2019/0178791 A1 Jun. 13, 2019

Related U.S. Application Data

(63) Continuation of application No. PCT/IB2017/055201, filed on Aug. 30, 2017.

(30) Foreign Application Priority Data

Sep. 8, 2016 (EP) ..................................... 16187793

(51) Int. Cl.
*G01N 21/27* (2006.01)
*G01N 21/64* (2006.01)
*G01N 21/80* (2006.01)
*G01N 21/77* (2006.01)
*G01N 21/78* (2006.01)

(52) U.S. Cl.
CPC ....... *G01N 21/274* (2013.01); *G01N 21/6456* (2013.01); *G01N 21/77* (2013.01);
(Continued)

(58) Field of Classification Search
CPC ... G01N 2021/7773; G01N 2021/7783; G01N 2021/7786; G01N 21/274; G01N 21/64;
(Continued)

(56) References Cited

U.S. PATENT DOCUMENTS 9,016,573 B2 * 4/2015 Stangelmayer ........... G06T 7/40
235/454
9,759,660 B2 * 9/2017 Stangelmayer .... G01N 21/6456
(Continued)

FOREIGN PATENT DOCUMENTS

DE 102010061182 A1 6/2012
DE 102011055272 A1 5/2013
(Continued)

OTHER PUBLICATIONS

International Search Report from PCT/IB2017/055201, filed Aug. 30, 2017, dated Dec. 7, 2017.
(Continued)

*Primary Examiner* — Maureen Wallenhorst
(74) *Attorney, Agent, or Firm* — Patentbar International, P.C.

(57) ABSTRACT

A method and measurement system for calibrated measurement of at least one variable of a sample are based on an optical behaviour of at least one sensor substance which depends on the at least one variable. The at least one sensor substance is brought into contact with the sample. At least one calibration area, associated with the at least one sensor substance, is defined. At least one image is recorded which captures at least one of the at least one sensor substance and at least one of the at least one calibration area. The value of the at least one variable of the sample is derived from the at least one image, based on image data associated with the at least one of the at least one sensor substance and on image data associated with the at least one of the at least one calibration area.

13 Claims, 5 Drawing Sheets

(52) U.S. Cl.
CPC ............. *G01N 21/80* (2013.01); *G01N 21/78* (2013.01); *G01N 2021/7773* (2013.01); *G01N 2021/7783* (2013.01); *G01N 2021/7786* (2013.01); *G01N 2201/0221* (2013.01); *G01N 2201/127* (2013.01)

(58) Field of Classification Search
CPC ........... G01N 21/6428; G01N 21/6456; G01N 21/77; G01N 21/78; G01N 21/80; G01N 2201/0221; G01N 2201/127; Y10T 436/10; Y10T 436/20; Y10T 436/204998; Y10T 436/207497; Y10T 436/209163
USPC ... 436/8, 127, 133, 136, 138, 163, 164, 165, 436/169, 172; 422/400, 401, 402, 420, 422/82.05, 82.08, 82.09
See application file for complete search history.

(56) References Cited

U.S. PATENT DOCUMENTS

| | | | |
|---|---|---|---|
| 2012/0189509 A1 | 7/2012 | Hsiao | |
| 2016/0139049 A1* | 5/2016 | Riechers | G01N 33/0062 435/288.7 |
| 2019/0017987 A1* | 1/2019 | Levine | G01N 21/6489 |

FOREIGN PATENT DOCUMENTS

| | | |
|---|---|---|
| DE | 102013108659 B3 | 7/2014 |
| DE | 102013109010 A1 | 2/2015 |
| DE | 102014107837 A1 | 12/2015 |
| EP | 0901620 B1 | 1/2002 |
| EP | 2762066 A1 | 8/2014 |
| GB | 2132348 A | 7/1984 |
| WO | 2004/017374 A2 | 2/2004 |
| WO | 2011/138705 A2 | 11/2011 |

OTHER PUBLICATIONS

J. Hofmann et al., Ratiometric luminescence 2D in vivo imaging and monitoring of mouse skin oxygenation, Methods and Applications in Fluorescence, 2013, vol. 1, 0450002 (1-9pp).

H. Zhu et al., Micro-patterning and characterization of PHEMA-co-PAM-based optical chemical sensors for lab-on-a-chip applications, Sensors and Actuators B, 173, Aug. 7, 2012, pp. 817-823.

R. J. Meier et al, Simultaneous photographing of oxygen and pH in Vivo using sensor Films, Angewandte Chemie International Edition, 2011, vol. 50, pp. 10893-10896.

* cited by examiner

METHOD FOR CALIBRATED OPTICAL MEASUREMENT AND SYSTEM THEREFOR

RELATED APPLICATIONS

This Application is a Continuation application of International Application PCT/IB2017/055201, filed on Aug. 30, 2017, which in turn claims priority to European Patent Application No. EP 16187793.1, filed Sep. 8, 2016, both of which are incorporated herein by reference in their entirety.

FIELD OF THE INVENTION

The invention relates to the measurement of a variable of a sample using an optical behaviour of a sensor substance, and specifically to the calibration of such a measurement.

BACKGROUND OF THE INVENTION

The UK patent application 8333822, published as GB 2 132 348 A, refers to a method and apparatus for determining the presence of oxygen. A sensor element is formed by incorporating a luminescent material whose intensity and lifetime of luminescence are quenchable by oxygen into a carrier material permeable to oxygen. A reference element is provided by incorporating the same luminescent material into a carrier material impermeable to oxygen; the reference element can have a wedge shape or hold the luminescent material at a concentration varying along the reference element. Sensor element and reference element are exposed to a sample to be analysed and are illuminated. Evaluation is done by the eye or an electronic device. An image is not recorded.

German translation DE 697 09 921 T2 of European patent EP 0 901 620 B1 relates to a detection apparatus for chemical analysis. In one embodiment, a sample container is divided into three chambers, one chamber for holding a sample to be analysed, the further two chambers holding reference solutions. For each variable of the sample to be measured, three separate optical readout setups are provided, one for each chamber, each readout setup including a light source and a photoelectric sensor. Signals from the photoelectric sensors of the readout setups for those chambers holding reference solutions are used to interpret the signals from the photoelectric sensor of the readout setup for the chamber holding the sample, i.e. for calibration of the measurement performed on the sample.

International patent application PCT/IB2011/051797, published as WO 2011/138705 A2, relates to a sensing device for optically detecting a substance in a fluid. The method of detection is based on total internal reflection at an interface, this total internal reflection depends on a number of magnetic particles present at the interface, which number in turn depends on a variable of a sample, here the concentration of the substance. No sensor substance with an optical behaviour that depends on the variable of the sample is used.

International patent application PCT/US2003/025702, published as WO 2004/017374 A2, discloses a method and corresponding apparatus for determining a variable of a sample, more precisely concentration of a substance. The method is based on fluorescent tags binding to molecules to be detected. The fluorescence of the tags as such is independent of the concentration of the substance. No sensor substance with an optical behaviour that depends on the variable of the sample is used.

European patent application 13154017, published as EP 2 762 066 A1, relates to the determination of oxygen in blood. A marker is placed on a person's skin. The marker has two marker areas which transmit light at a first and at a second wavelength, respectively. The marker is not in contact with blood. The determination is based on the difference in absorption of the first and second wavelength by oxygenated haemoglobin and by reduced haemoglobin. No sensor substance with an optical behaviour that depends on the variable of the sample is used.

Measurements of a variable of a sample based on an optical behaviour of a sensor substance in principle are well known, numerous approaches exist, as well as suitable sensor elements and sensor substances for such measurements. Some of these methods and/or sensor elements are described for example in published German patent applications DE 10 2011 055 272 A1, DE 10 2013 109 010 A1, DE 10 2010 061 182 A1, DE 10 2014 107 837 A1, German patent DE 10 2013 108 659 B3, and references cited therein. The measurement principles and approaches described in this prior art can also be applied in the context of the present invention. The sensor substance may in particular be a chemical compound directly affected by the variable of the sample to be measured, or may be a mixture of several compounds. For example, the sensor substance may be a fluorophore in a buffer solution, where the fluorophore is affected indirectly by the variable to be measured via a change of a pH-value of the buffer solution, with an optical behaviour of the fluorophore depending on pH-value, and the pH-value of the buffer solution for example changed by carbon dioxide, thus making possible a measurement of a partial pressure of carbon dioxide. Numerous such examples are known in the prior art, and the invention is in no way limited to the specific examples just mentioned.

Measurements, to be reliable, require calibration of the measurement setup. Calibration is an extra step, usually performed prior to the measurement proper, requiring additional effort on the part of a user of the measurement setup. If a measurement setup has been calibrated and reliable measurements are to be performed with it, it must be assured that the measurements are performed at conditions which do not render the calibration useless, or at least corrections for deviations from the calibration conditions must be taken into account. This requires determining the relevant conditions at which the measurement is performed and deviations from the calibration conditions. Therefore, taking into account calibration for correct measurements amounts to significant additional effort.

SUMMARY OF THE INVENTION

It is an object of the present invention to provide a method for calibrated measurement of at least one variable of a sample, wherein the effort for calibration is reduced in comparison with the prior art.

This object is achieved by a method according to claim 1.

Claim 17 relates to a corresponding measurement system.

In the method according to the invention for calibrated measurement of at least one variable of a sample, a contact between the sample and at least one sensor substance is established. Each of the at least one sensor substance exhibits an optical behaviour dependent on at least one of the at least one variable of the sample. The contact between a respective sensor substance and the sample must be such that the optical behaviour of the respective sensor substance can be affected by the sample. For example, the at least one variable of the sample may be a concentration of a substance, a partial pressure of a substance, a pH-value, a pressure, or a temperature. In case the variable is a concentration or partial pressure of a substance, this substance must be able to reach the sensor substance. If the variable is a pressure, the contact must be such that the sensor substance is exposed to the pressure. If the variable is temperature, then heat exchange between the sensor substance and the sample must be possible. As non-limiting examples, the method may be used to determine partial pressure of gases like oxygen or carbon dioxide in a gas or liquid environment, or a concentration of ions like ammonium or of certain molecules in a liquid. By the method according to the invention measurements may also be performed on liquid layers adhered to or emanating from a solid object or on gases diffusing out of a solid object.

It is possible that the optical behaviour of a sensor substance depends on more than one variable of the sample. It is possible that two or more different sensor substances are used, all of which have a respective optical behaviour that depends on the same variable of the sample. For each variable of the sample to be measured there must be at least one sensor substance with an optical behaviour that depends on the respective variable of the sample.

According to the method, at least one calibration area is defined. Each such calibration area is associated with at least one sensor substance used in the method; here the association is such that the respective calibration area is used for calibration of a measurement involving the respective at least one sensor substance. There can be more than one calibration area per sensor substance. Also, if a sensor substance is used for measuring more than one variable of the sample, then for this sensor substance there can be one or more calibration areas for each variable of the sample in the measurement of which the respective sensor substance is used.

Further according to the method, at least one image is recorded. Each of the at least one image captures at least a portion of at least one of the at least one sensor substance and at least a portion of at least one of the at least one calibration area. The image preferentially is recorded with a camera.

The at least one image is a digital image and the value of the at least one variable of the sample is determined from the at least one image. Image data associated with the at least one sensor substance, e.g. pixel values of pixels which in the image represent the at least one sensor substance, i.e. which represent an area or region of space in which the sensor substance is present and in contact with the sample, and image data associated with the at least one calibration area, e.g. pixel values of pixels which in the image represent the at least one calibration area, are used to determine the value of the at least one variable of the sample.

Determining the value of a variable of the sample is to be understood to include the determination of the value of the variable up to error bounds known in the art, but is also to include determining whether the value of the variable is within a given range, where this range can have only an upper bound or only a lower bound or both an upper bound and a lower bound.

Image data associated with a calibration area are used for calibrating the measurement, as will be detailed further below. Thus each recorded image not only holds sensor output in the form of image data associated with at least one sensor substance, but also calibration data in the form of image data associated with at least one calibration area. The effort for calibration therefore is reduced in comparison with prior art methods; recording one of the at least one image is a single step, but yields both sensor output and calibration data, which subsequently can be evaluated automatically.

Furthermore, any changes in ambient conditions, like e.g. temperature or salinity, that may affect the optical behaviour of the at least one sensor substance in addition to the at least one variable which is to be measured using the sensor substance, at least in embodiments also affect the at least one calibration area in a similar fashion. Therefore, deviations from calibration conditions are taken into account automatically, making calibrated measurements easier than in prior art.

In embodiments, the optical behaviour of a sensor substance is an optical parameter of the sensor substance, e.g. a colour of the sensor substance, which optical parameter depends on a variable of the sample. For example, if the said variable of the sample changes in a defined way, the colour of the sensor substance changes. Such an optical parameter can be measured by known methods, for example colour can be measured by known colorimetric methods. Further non-limiting examples of optical parameters are reflectance of the sensor substance and transmittance of the sensor substance, in each case possibly for a specific wavelength range. In embodiments, the optical behaviour of a sensor substance is a luminescence effect. Luminescence includes both phosphorescence and fluorescence. For example, the intensity, colour, or polarisation of luminescence light emitted by the sensor substance upon suitable excitation may depend on at least one variable of the sample. Further examples include that a decay time of luminescence intensity or luminescence polarisation depends on at least one variable of the sample. Measurement approaches exploiting such dependencies are well known, and also described in the cited prior art.

In particular, the at least one image may be recorded with a handheld device. Use of a handheld device makes the measurement method especially easy to use and particularly suitable for field work.

In an embodiment, at least one of the at least one sensor substance is provided embedded in a sensor element or attached to the surface of a sensor element. The contact between the sensor substance and the sample is established by bringing the sensor element into contact with the sample. The sensor element may for example include a polymer matrix into which the sensor substance is embedded, and which is permeable to a substance to be measured using the respective sensor substance. The sensor elements can be manufactured in suitable sizes and shapes, for example by punching or cutting sensor elements from a polymer matrix holding the sensor substance. The sensor elements are not limited to including a polymer matrix. Sensor elements of various constitutions and ways to produce them are known in the art. While, in principle, one or more sensor substances used in the inventive method can be mixed with the sample, having one or more sensor substances embedded in or attached to a sensor element has the advantage of providing the sensor substance(s) at a defined position in the sample, just by suitably positioning the sensor element. Furthermore, by use of a sensor element, properties like thickness of a layer holding one or more sensor substances can easily be fixed, as such properties are determined by manufacture of the sensor elements.

In an embodiment of the method employing one or more sensor elements, the one or more sensor elements may be identified in the at least one image by the position, size, or shape of the sensor element. For example, if a first sensor element is used to measure a first variable of a sample, e.g. pH-value, and a second element is used to measure a second variable of the sample, e.g. partial pressure of oxygen, then the first sensor element may be shaped as a square, while the second sensor element may be shaped as a triangle, so the sensor elements can be distinguished by their shape. It should be clear that the choice of square and triangle is merely an example and in no way a limitation of the invention.

As stated above, both image data associated with at least one sensor substance and image data associated with at least one calibration area are used for determining the at least one variable of the sample. In an embodiment, at least one calibration area is defined by exposing a portion of at least one sensor substance to defined ambient conditions, wherein such defined ambient conditions include a pre-determined value of at least one of the at least one variable of the sample. For example, if the calibration area is to be used to calibrate a measurement of a pH-value, then the calibration area is defined by exposing a portion of the sensor substance used for the measurement of the pH-value to a defined pH-value. In this embodiment, of course, when recording the at least one image for measurement, apart from the portion of the sensor substance in the calibration area, or part thereof, also a portion of the sensor substance exposed to the variable of the sample to be measured, in the example to the pH-value of the sample, must be recorded.

In an embodiment, at least one calibration area is defined by a calibration element. A calibration element in this embodiment is analogous to a sensor element discussed above, and therefore has at least one sensor substance embedded within the calibration element or attached on a surface of the calibration element. In contrast to a sensor element holding the same sensor substance, the sensor substance in the calibration element is exposed to defined ambient conditions, as described above in the general context of a calibration area. For the example of a pH-measurement, the calibration element, sealed against the sample, may contain the sensor substance used for pH-measurement in a solution of defined pH-value, for example embedded in a polymer matrix. A calibration area, or a calibration element, in embodiments is exposed to the defined ambient conditions only when a measurement is to be performed. In such a case it is possible to change, between measurements, the range of the value of the variable to be measured for which calibration is done, by choosing suitable ambient conditions to which the calibration area is exposed.

The calibration approach described so far is based on exposing different portions of one and the same sensor substance, respectively, to the sample and to defined conditions. By exposing the sensor substance to defined conditions, an optical behaviour corresponding to the defined conditions obviously is achieved. An alternative approach to calibration achieves the desired optical behaviour, i.e. an optical behaviour that corresponds to the optical behaviour of a specific sensor substance under defined conditions, in a different way. In embodiments, therefore, at least one calibration area is defined by a calibration element exhibiting an optical behaviour corresponding to the optical behaviour of at least one sensor substance at a pre-determined value of at least one of the at least one variable of the sample. For example, in case the sensor substance is such that an intensity of a luminescence light emitted by the sensor substance depends on a variable of the sample, a calibration element could be prepared in the following way: In a suitable support a luminescent substance is provided in an amount that produces a desired luminescence intensity under defined excitation. The amount of luminescent substance can be chosen such that the luminescence intensity corresponds to the luminescence intensity of the sensor substance at a desired value of the variable of the sample that is measured using the sensor substance. The luminescent substance used in the calibration element can be, but need not be, the same as the sensor substance.

In an embodiment, a calibration area may be identified in the at least one image by position, size, or shape of the calibration area. For example, for the measurement of a specific variable of a sample, two calibration elements may be provided, a first calibration element corresponding to an expected upper bound of the variable of the sample, and a second calibration element corresponding to an expected lower bound of the variable of the sample. The first calibration element may be shaped as a circle, the second calibration element may be shaped as a square, and thus the first and the second calibration element can be distinguished in the at least one image by their shape. It should be clear that the choice of circle and square is a mere example, and in no way a limitation of the invention.

In an embodiment, at least one of the at least one sensor substance and at least one of the at least one calibration area are provided on a common carrier. For example, the carrier may act as common support for one or more sensor elements, and for one or more calibration elements which correspond to the sensor elements, i.e. which are used to calibrate the measurements for which the sensor elements are used. Sensor elements and calibration elements for example may be realised as defined portions of the common carrier, or may be attached as separately manufactured elements to the carrier.

In an embodiment a plurality of images is recorded, and at least two of the recorded images differ with respect to the wavelength region of light recorded in the respective images. This may for example be achieved by using suitable optical filters.

In an embodiment a first image and a plurality of second images are recorded. The first and the plurality of second images all capture the same portion of at least one of the at least one sensor substance and the same portion of at least one of the at least one calibration area. For example, the first and all of the second images may fully show one and the same carrier, this carrier holding a number of sensor elements and corresponding calibration elements. At least one variable of the sample is determined based on image data associated with the at least one of the at least one calibration area in the first image and on image data associated with the at least one of the at least one sensor substance in the plurality of second images. Alternatively, at least one variable of the sample is determined based on image data associated with the at least one of the at least one calibration area in the first image and on image data associated with the at least one of the at least one sensor substance in the first image and in the plurality of second images. Put differently, for determining the at least one variable, image data associated with the sensor substance is used from the second images and optionally additionally from the first image, while calibration of the measurements is based only on image data from the first image.

In an embodiment a plurality of images is recorded, each image capturing the same portion of at least one of the at least one sensor substance and the same portion of at least one of the at least one calibration area. For example, all images of the plurality of images may fully show one and the same carrier, this carrier holding a number of sensor elements and corresponding calibration elements. At least one variable of the sample is determined for each of the plurality of images based on image data associated with the at least one of the at least one calibration area and on image data associated with the at least one of the at least one sensor substance in the respective image. Put differently, the at least one variable is determined separately for each image, based on image data from the respective image.

In an embodiment, at least a portion of at least one sensor substance and at least a portion of at least one calibration area are exposed to light of at least one pre-defined wavelength range in order to probe the optical behaviour of the at least one of the at least one sensor substance and/or to record at least one of the at least one image. Probing the optical behaviour of a sensor substance may include, without being limited thereto, determining at least one of colour, reflectance, transmittance of the sensor substance, or exciting for example a luminescence of the sensor substance.

For at least one variable the value of the at least one variable may be determined in a space-resolved manner, i.e. the method may capture, record and evaluate a variation of the value of the at least one variable across the sample or across a portion of the sample. This can for example be achieved using a sensor element which covers a respective portion of the sample or by distributing a plurality of sensor elements across the respective portion of the sample.

The measurement system according to the invention for calibrated measurement of at least one variable of a sample may be used in carrying out one or more embodiments of the method according to the invention. The measurement system includes a camera and a control and evaluation unit. According to the invention, the measurement system includes an arrangement of at least one sensor area and of at least one calibration area; this arrangement, in embodiments, is provided on a carrier. Each of the at least one sensor area contains at least one sensor substance. Each of the at least one sensor substance exhibits an optical behaviour dependent on at least one of the at least one variable of the sample. Each of the at least one calibration area is associated with at least one of the at least one sensor substance; the association is such that the respective calibration area is used for calibrating a measurement in which the at least one of the at least one sensor substance is used. If provided on a carrier, a sensor area and a calibration area may be realised as defined respective portions of the carrier or be attached to the carrier as separate elements.

The control and evaluation unit is configured to control the measurement system to record at least one image of at least a portion of the arrangement of at least one sensor area and of at least one calibration area with the camera, and to determine at least one of the at least one variable of the sample from the at least one recorded image, based on image data of the at least one recorded image associated with the at least one sensor substance and on image data of the at least one recorded image associated with the at least one calibration area. Here it is clear that the at least one image has to contain appropriate image data, i.e. image data associated with at least one sensor substance and image data associated with a calibration area associated with the at least one sensor substance. If the arrangement is provided on a carrier, at least one image of the carrier may be recorded. However, it is also conceivable to define the sensor area by a volume occupied by the sample which is mixed with at least one sensor substance. It is also conceivable that the sensor area and/or calibration area are provided as separate sensor elements and calibration elements, respectively, to be distributed on or in the sample.

In an embodiment, the measurement system includes a light source configured to emit, under control by the control and evaluation unit, light of at least one pre-defined wavelength range in order to probe the optical behaviour of at least one of the at least one sensor substance and/or to record at least one of the at least one image. In a non-limiting example of the measurement system, the light source includes one or more light-emitting diodes (LEDs). In another non-limiting example of the measurement system, the light source includes one or more lasers. In case a laser is used as light source of the measurement system, the wavelength range of the light used to probe the optical behaviour of the at least one of the at least one sensor substance may be defined by the line-width of the laser.

In an advantageous embodiment, the camera and the control and evaluation unit are included in a handheld device. In a specific embodiment, also a light source for the measurement system, as described above, is included in the handheld device.

BRIEF DESCRIPTION OF THE DRAWINGS

Below, the invention and its advantages are illustrated in further detail with reference to the accompanying drawings.

The figures show only examples of the invention and are not to be interpreted as a limitation of the invention to the specific embodiments shown in the figures.

DETAILED DESCRIPTION OF THE PREFERRED EMBODIMENTS

Figure 1:
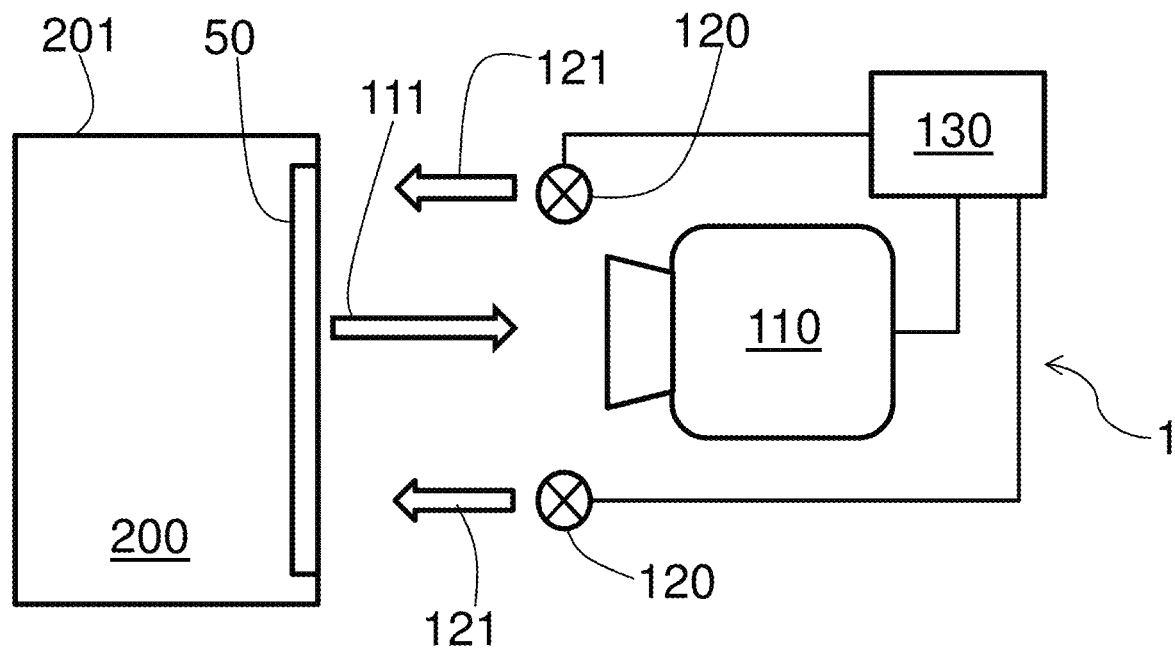
FIG. 1 shows a schematic setup for performing the method according to the invention.

FIG. 1 shows an example of a schematic setup for performing the method according to the invention, using a measurement system 1 according to the invention. The measurement system 1, in the embodiment shown, includes a carrier 50, a camera 110, light sources 120, and a control and evaluation unit 130. A sample 200 is contained within a sample container 201. In the example shown, carrier 50 is placed inside the sample container 201, on a wall of the sample container 201. The sample container 201 can be an arbitrary container suitable for holding the sample, and, dependent on the context of a particular use of the invention, may for example be a beaker, a bottle holding a beverage, or a bag for holding medical samples like urine or blood. The carrier 50 includes at least one sensor substance (not shown) and at least one calibration area (not shown). Light sources 120 are provided for emitting light 121, to probe an optical behaviour, for example to excite a luminescence, of the at least one sensor substance, and, as the case may be, of the at least one calibration area. Light 111 from the at least one sensor substance and the at least one calibration area reaches camera 110 used to record at least one image, the image here capturing at least a portion of the carrier 50 including at least a portion of at least one of the at least one sensor substance and at least a portion of at least one of the at least one calibration area. It should be clear that in the example shown at least the wall of the sample container 201 holding the carrier 50 must be transparent to light 121 from the light sources 120 and light 111 from the at least one sensor substance and the at least one calibration area. "Transparent" here means that the wall of the sample container 201 lets pass an amount of light sufficient for conducting the measurement. Control and evaluation unit 130 controls the operation of light sources 120 and camera 110, and is used to evaluate image data of the at least one recorded image to determine a value of at least one variable of the sample 200. The sample 200 may for example be a liquid or a gas.

Figure 2:
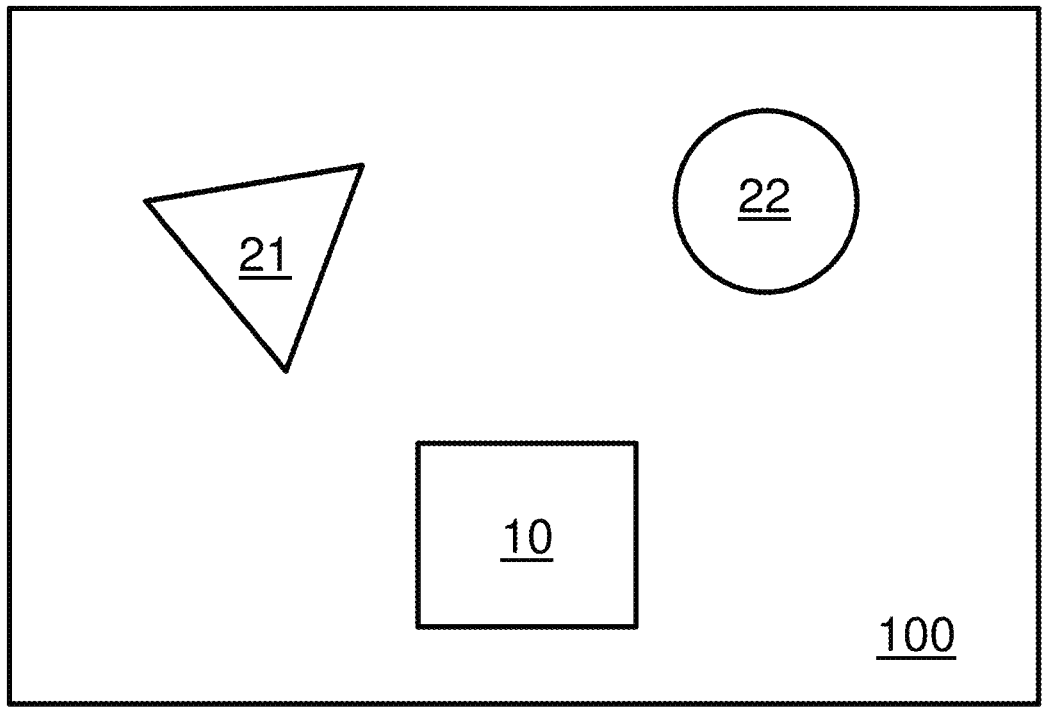
FIG. 2 shows an example of an image of a sensor element and calibration elements.

FIG. 2 shows an example of an image 100 recorded according to the method according to the invention. The image 100 is of a portion of a sample, and the image 100 captures a sensor element 10, as well as a first calibration element 21 and a second calibration element 22. The sensor element 10 and the first and second calibration elements 21, 22 differ by their shape. The sensor element 10 is shaped as a rectangle, the first calibration element 21 is shaped as a triangle, and the second calibration element 22 is shaped as a circle. An embodiment of the method according to the invention can distinguish these shapes in the image 100 by image analysis, and therefore identify the sensor element 10, the first calibration element 21 and the second calibration element 22 in the image 100. Preferentially, distinguishing the shapes and identification of the sensor element 10, the first calibration element 21 and the second calibration element 22 in the image 100 can be accomplished independently of the orientation of the image, so that a precise alignment between sample or sensor element 10 and calibration elements 21, 22 on the one hand, and image recording equipment, e.g. camera 110 of FIG. 1, on the other hand, is not required. This is a general advantage, but of particular interest in cases in which a handheld device is used for recording the image 100.

The image analysis may, for example, in a first step identify areas of interest in the recorded image, defined by pixels having pixel values above a pre-defined threshold. Such areas of interest are taken to correspond to sensor areas/elements and calibration areas/elements. By determining for example sets of distances along various directions, in terms of pixel positions, between pixels at the boundaries of areas of interest, the shape and size of the respective areas of interest can be inferred, in particular if referred to pre-determined criteria, stored for example in control and evaluation unit 130 shown in FIG. 1. In this way, the areas of interest can be identified as sensor elements and calibration elements, in the example of FIG. 2 in particular sensor element 10 and calibration elements 21, 22 can be distinguished. Position of the sensor areas/elements and calibration areas/elements can be determined based on the positions of the pixels representing the respective areas/elements in the image 100. Different methods of image analysis may of course also be used.

As an example, the sensor element 10 may hold a luminescent substance the luminescence intensity of which depends on a value of a variable of the sample. The first calibration element 21 may show, independently of the value of the variable of the sample, a luminescence intensity which is equal to the luminescence intensity of the luminescent substance in the sensor element 10 at a value of the variable of the sample that is an expected minimum value of the variable of the sample. The second calibration element 22 may show, independently of the value of the variable of the sample, a luminescence intensity which is equal to the luminescence intensity of the luminescent substance in the sensor element 10 at a value of the variable of the sample that is an expected maximum value of the variable of the sample.

Instead of the luminescence intensity, a decay time of the luminescence may for example be used, of course both for the sensor element 10 and for the first calibration element 21 and the second calibration element 22.

The sensor element 10 contains the sensor substance in such a way that the sensor substance is in contact with the sample, where this contact is such that the optical behaviour, e.g. luminescence, of the sensor substance, used for measuring a variable of the sample, can be affected by this variable of the sample. The first calibration element 21 and the second calibration element 22, in an embodiment, contain the same sensor substance, however, in such a way that the sensor substance is held within the calibration elements 21, 22 at respective defined conditions, where such defined conditions include a defined value of the variable of the sample to be measured with the sensor element 10. The first calibration element 21 and the second calibration element 22 may, however, be in such a contact with the sample that the sensor substance they contain is affected by other conditions of the sample. For example, if the sensor element 10 is used to measure pH-value, the sensor substance in the sensor element 10 is in such a contact with the sample that the sensor substance in the sensor element 10 is exposed to the pH-value of the sample. The sensor substance in the calibration elements 21 and 22 is held at defined pH-values, but may still be in thermal contact with the sample, and thus take into account automatically changes of the temperature of the sample for calibration. A further example may be that the sensor element 10 is used to measure the partial pressure of carbon dioxide, in which case the sensor substance in the calibration elements 21 and 22 is held at defined values of the partial pressure of carbon dioxide, but the sensor substance in the calibration elements 21 and 22 may still be in such contact with the sample that the sensor substance in the calibration elements 21 and 22 is affected by concentrations of certain ions in the sample; the sensor substance in the sensor element 10 is of course in such contact with the sample that the sensor substance in the sensor element 10 is affected by the partial pressure of carbon dioxide in the sample. In this way, cross-sensitivities of the sensor substance to the concentrations of these ions are taken into account automatically for calibration.

Generally, in embodiments in which both the sensor element 10 and the calibration elements 21, 22 hold the same sensor substance, any cross-sensitivity of the sensor substance may affect both the sensor element 10 and the calibration elements 21, 22. In this case, this cross-sensitivity is taken into account automatically in the calibration and requires no separate steps.

By analysing image data of the image 100, in particular values of pixels of the image 100 which correspond, respectively, to the sensor element 10 and the first calibration element 21 and the second calibration element 22, a calibrated measurement of the at least one variable of the sample can be performed.

Figure 3:
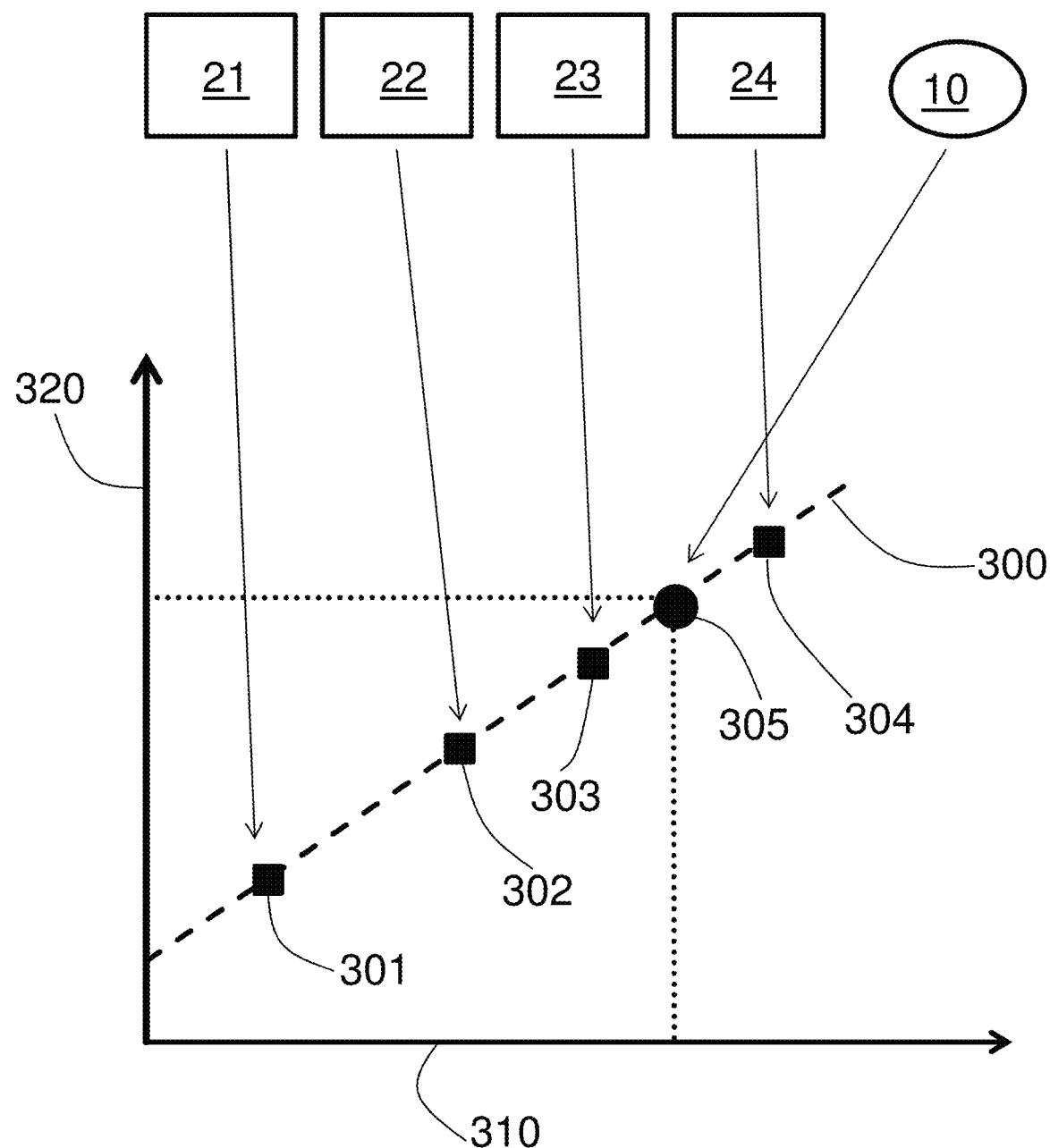
FIG. 3 illustrates the concept of calibration.

FIG. 3 illustrates calibration. In the example, four calibration elements 21, 22, 23, and 24 are shown. For the sake of concreteness, but not as a limitation, all calibration elements 21, 22, 23, 24 shown are assumed to hold a sensor substance showing a luminescence behaviour with a decay time that depends on the partial pressure of oxygen. Each of the calibration elements 21, 22, 23, 24 contains the sensor substance exposed to a different, pre-defined value of the partial pressure of oxygen. A coordinate system with abscissa 310 and ordinate 320 is shown. The abscissa 310 gives values of the partial pressure of oxygen, the ordinate 320 corresponding values of a quantity characterising the optical behaviour of the sensor substance, here in particular characterising the decay time of the luminescence, for instance the ratio of two integrals of decaying luminescence signals, the integrals evaluated over defined time intervals during the decay of the luminescence; such ratiometric measurements as well as alternative approaches are described further in the cited prior art. Each of the calibration elements 21, 22, 23, 24 with a known pre-defined value of the partial pressure of oxygen and a measured ratio of integrals of luminescence signals yields a point in the coordinate system. As indicated by the arrows, calibration element 21 yields point 301, calibration element 22 yields point 302, calibration element 23 yields point 303, and calibration element 24 yields point 304. These points 301, 302, 203, 304 define a curve 300, here a straight line, to which ratios of integrals of luminescence signals, obtained for example from a sensor element 10, can be referred in order to find the corresponding partial pressure of oxygen. More precisely, the ratio from the sensor element 10 is measured, and a point 305 on the line 300 is found with a value on the ordinate 320 which corresponds to this ratio. The abscissa of this point 305 gives the value of the partial pressure of oxygen. By processing image data from both sensor elements and calibration elements, the method according to the invention achieves a calibrated measurement of at least one variable of the sample, in the example just discussed of the partial pressure of oxygen.

In case measurements using calibration elements 21, 22, 23, 24 and sensor element 10 are performed at different temperatures, at different temperatures different lines 300 may result, as the relaxation time of the sensor substance used may not only depend on the partial pressure of oxygen, but also on temperature. However, in such a case, also the ratio obtained from the sensor element 10 will be referred to the respective line 300 produced for the respective temperature. The principle just explained for the example of temperature also applies to other parameters of the ambient conditions, for example salinity or pH-value. Therefore, in the inventive method, by using image data associated with a sensor substance, here in sensor element 10, and image data associated with at least one calibration area, here calibration elements 21, 22, 23, 24, a calibration corrected for ambient conditions can automatically be taken into account in the measurements. In the same manner, conditions affecting the recording of images of the sensor element 10 and the calibration elements 21, 22, 23, 24 are taken into account in the calibration. Such conditions include, for example, ambient lighting, distance between sample and recording equipment, e.g. camera, size of sensor element 10 and of calibration elements 21, 22, 23, 24.

Figure 4:
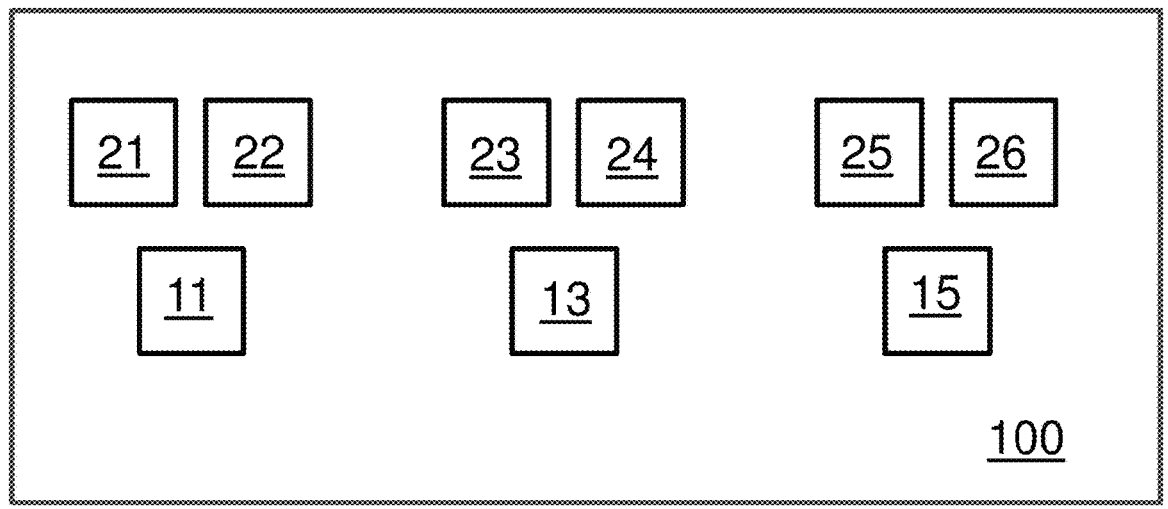
FIG. 4 shows an example of an image of sensor elements and calibration elements.

FIG. 4 shows an example of an image 100 recorded in the method according to the invention. The image 100 shows three sensor elements 11, 13, 15 and six calibration elements 21, 22, 23, 24, 25, 26. The sensor element 11 is used to measure a first variable of the sample, the sensor element 13 is used to measure a second variable of the sample, the sensor element 15 is used to measure a third variable of the sample. Calibration areas 21 and 22 are used to calibrate measurements of the first variable, i.e. measurements for which sensor element 11 is used. Calibration areas 23 and 24 are used to calibrate measurements of the second variable, i.e. measurements for which sensor element 13 is used. Calibration areas 25 and 26 are used to calibrate measurements of the third variable, i.e. measurements for which sensor element 15 is used. In this way, embodiments of the method according to the invention can determine, by a calibrated measurement, the values of a plurality of variables of the sample, by processing image data of an image 100 capturing sensor elements which correspond to each of the plurality of variables and their associated calibration elements.

In the image 100 shown, the sensor elements 11, 13, 15 and the calibration elements 21, 22, 23, 24, 25, 26 may be distinguished based on their respective positions.

Figure 5:
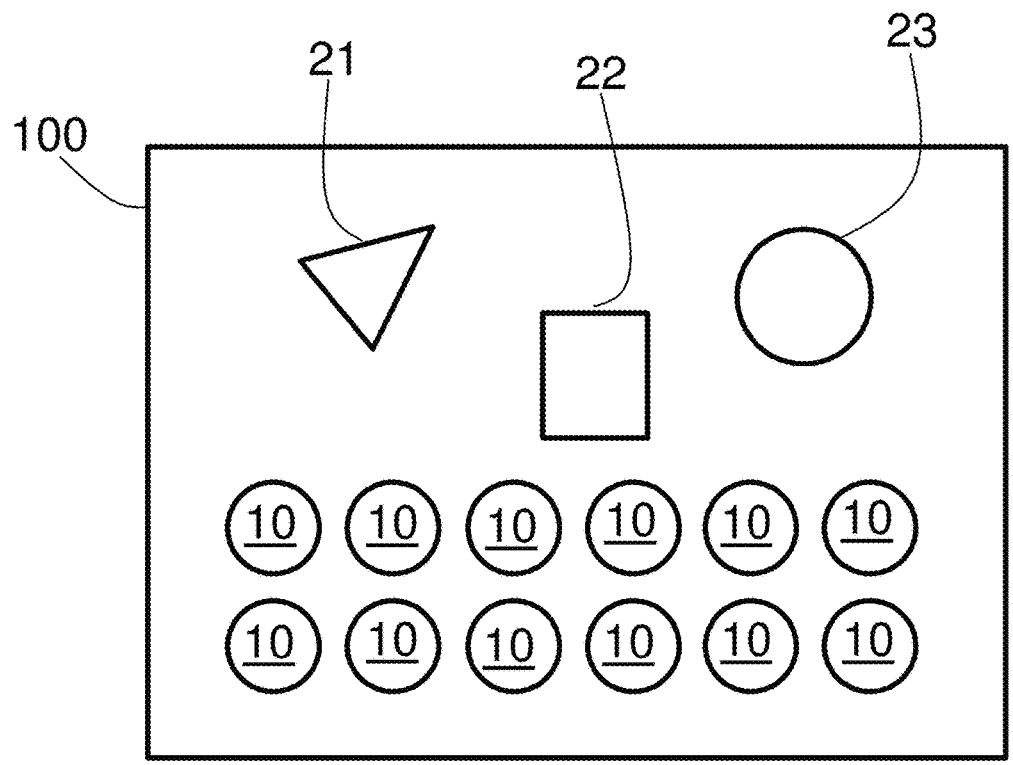
FIG. 5 shows a further example of an image of sensor elements and calibration elements.

FIG. 5 shows an example of an image 100 recorded in the method according to the invention. The image 100 shows three calibration elements 21, 22, 23, which can be distinguished by their shape, and a plurality of sensor elements 10, which can be distinguished by their position. In the example shown, all the sensor elements 10 are used for measuring the same variable of the sample at different positions of the sample, and the calibration elements 21, 22, 23 are used for calibration of these measurements. In a specific case, the sample may comprise a plurality of separate portions, for example, in a microtiter plate each well of the microtiter plate may hold a portion of the sample and one of the sensor elements 10. In this case, by recording image 100 and analysing the image data from sensor elements 10 and calibration elements 21, 22, 23, calibrated measurements of the variable may be performed in parallel for each well of the microtiter plate captured in the image 100. This embodiment can also be considered a special case of a space-resolved measurement of the variable.

Figure 6:
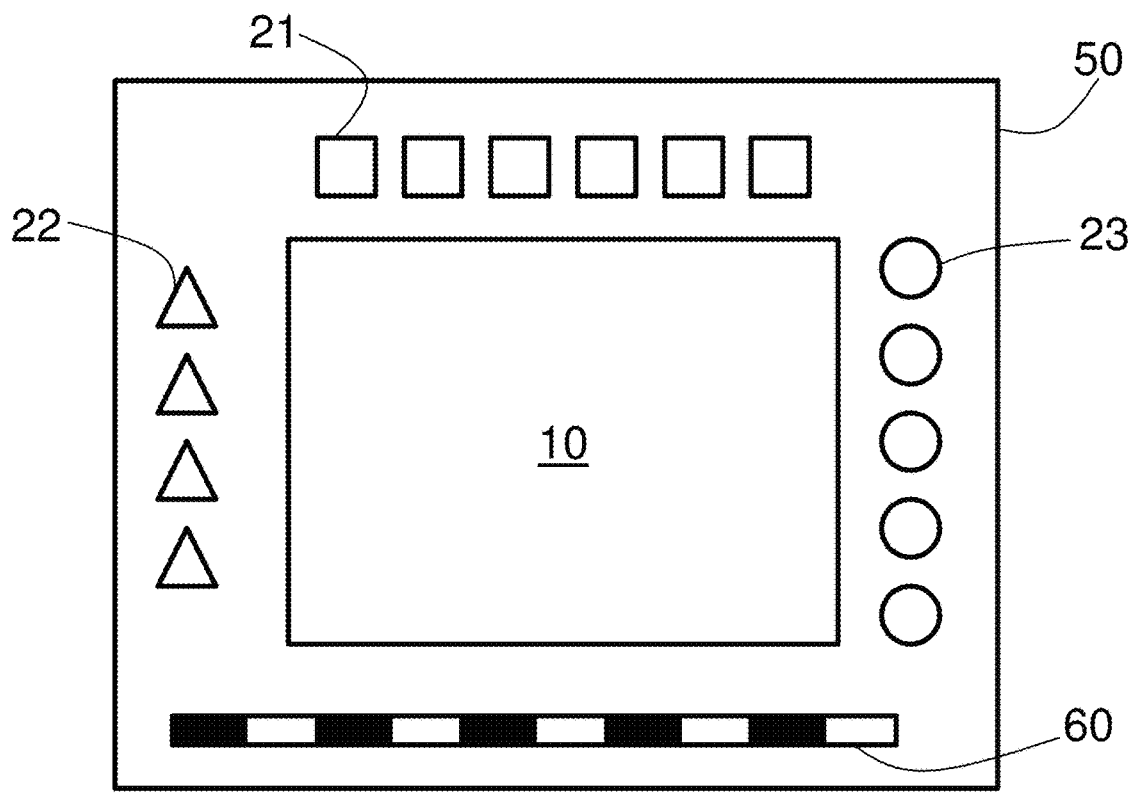
FIG. 6 shows a carrier with a sensor element for space-resolved measurements.

FIG. 6 shows an example of a carrier 50. The carrier 50 includes a sensor element 10, to be used for space resolved measurements. In the example shown, the sensor element 10 includes three sensor substances, each sensor substance showing an optical behaviour that depends on a different variable of a sample. Each of the three sensor substances is distributed homogeneously over the area of the sensor element 10. For concreteness, but without limiting the invention, a first sensor substance shows an optical behaviour that depends on a pH-value of the sample, a second sensor substance shows an optical behaviour that depends on a partial pressure of oxygen of the sample, and a third sensor substance shows an optical behaviour that depends on a partial pressure of carbon dioxide of the sample. For calibration of these measurements, three groups of calibration elements are provided, one group for each variable. The calibration elements 21 are shaped as squares, form the first group, and are used to calibrate measurements of pH-value. The calibration elements 22 are shaped as triangles, form the second group, and are used to calibrate measurements of the partial pressure of oxygen. The calibration elements 23 are shaped as circles, form the third group, and are used to calibrate measurements of the partial pressure of carbon dioxide. In the example of a carrier 50 shown in FIG. 6, the carrier 50 furthermore includes a length scale 60.

For performing a measurement, the carrier 50 is brought into contact with a sample, for example in the manner shown in FIG. 1. The sensor substances in the sensor element 10 then are in contact with the sample. An image of the carrier 50 is recorded, this image thus capturing the sensor element 10 and the calibration elements 21, 22, 23. Image data from the image, in particular corresponding to the sensor element 10 and the calibration elements 21, 22, 23 are processed, as described above, to obtain calibrated measurement values of the three variables of the sample, in the example mentioned of pH-value, partial pressure of oxygen, and partial pressure of carbon dioxide.

Across the part of the sample in contact with the sensor element 10 each of the three variables of the sample mentioned may vary, and therefore, for each of the three sensor substances, different portions of the sensor substance may be exposed to different values of the variable of the sample for the measurement of which the sensor substance is used. Therefore, the optical behaviour of each sensor substance may vary across the sensor element 10, corresponding to a variation of the respective variable of the sample. This can be exploited for space-resolved measurement of each of the three variables.

The result of such a space resolved measurement for one variable may for example be shown on a display as a colour-coded distribution of the values of the respective variable over the area covered by the sensor element 10. A user may switch between the variables to be displayed. As an alternative, an average value of each variable across the area of the sensor element 10 may be calculated and displayed to the user. Displaying values of the measured variables to a user is an option that of course also exists if no space-resolved measurement is conducted in the first place, for example in cases where sensor elements like those shown in FIGS. 2 and 4 are used.

In order to measure more than one variable, light from the sensor substances and the calibration elements may be split into different wavelength ranges, where the different wavelength ranges correspond to different variables. This may be achieved for example by suitable optical filters or other known optical elements. It may also be possible to record more than one image, wherein for each image illumination from a different wavelength range is used. This option may for example be chosen if the optical behaviour, e.g. luminescence, of different sensor substances requires different wavelengths to be probed, and it is preferred to avoid mutual perturbations of the evaluation of the luminescence behaviour of one sensor substance by the luminescence behaviour of the other sensor substances.

Figure 7:
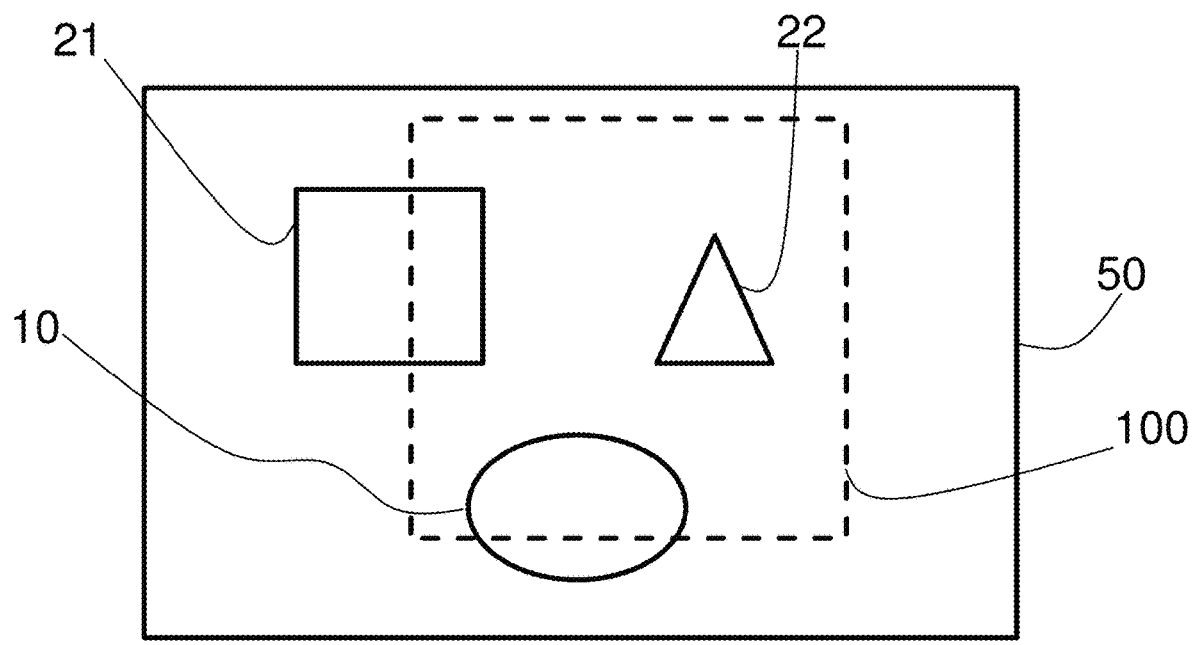
FIG. 7 shows a carrier and an area of which an image is taken.

FIG. 7 shows a carrier 50 including a sensor element 10 for measuring a variable of a sample and calibration elements 21 and 22 for calibrating the measurement of this variable. Also shown, by dashed lines, is an area of which an image 100 is taken, in order to evaluate the image data for determining the variable of the sample. As can be seen, in the example shown, only calibration element 22 is captured fully by the image 100, while of calibration element 21 and sensor element 10 only a portion is captured by the image 100. Depending on the image analysis and measurement principle used, such an image 100 may still be useful for measurement. If, for example, the sensor substance in sensor element 10 shows a luminescence the decay time of which depends on the variable to be measured, and this dependence is used for measurement, then, although only a portion of the sensor element 10 and only a portion of the calibration element 21 are captured by the image 100, the measurement can still be performed successfully. On the other hand, if the measurement is based on luminescence intensity, a successful measurement may require more elaborate image analysis. For example, the method may recognize, by image analysis, that only a portion of sensor element 10 and calibration element 21 have been captured, in particular identify the captured portions of the sensor element 10 and the calibration element 21 as such, and determine the value of the variable based on an average intensity, corresponding to an average pixel value, of the pixels corresponding to, respectively, the captured portions of sensor element 10 and of calibration element 21, and to the entire calibration element 22.

Figure 8:
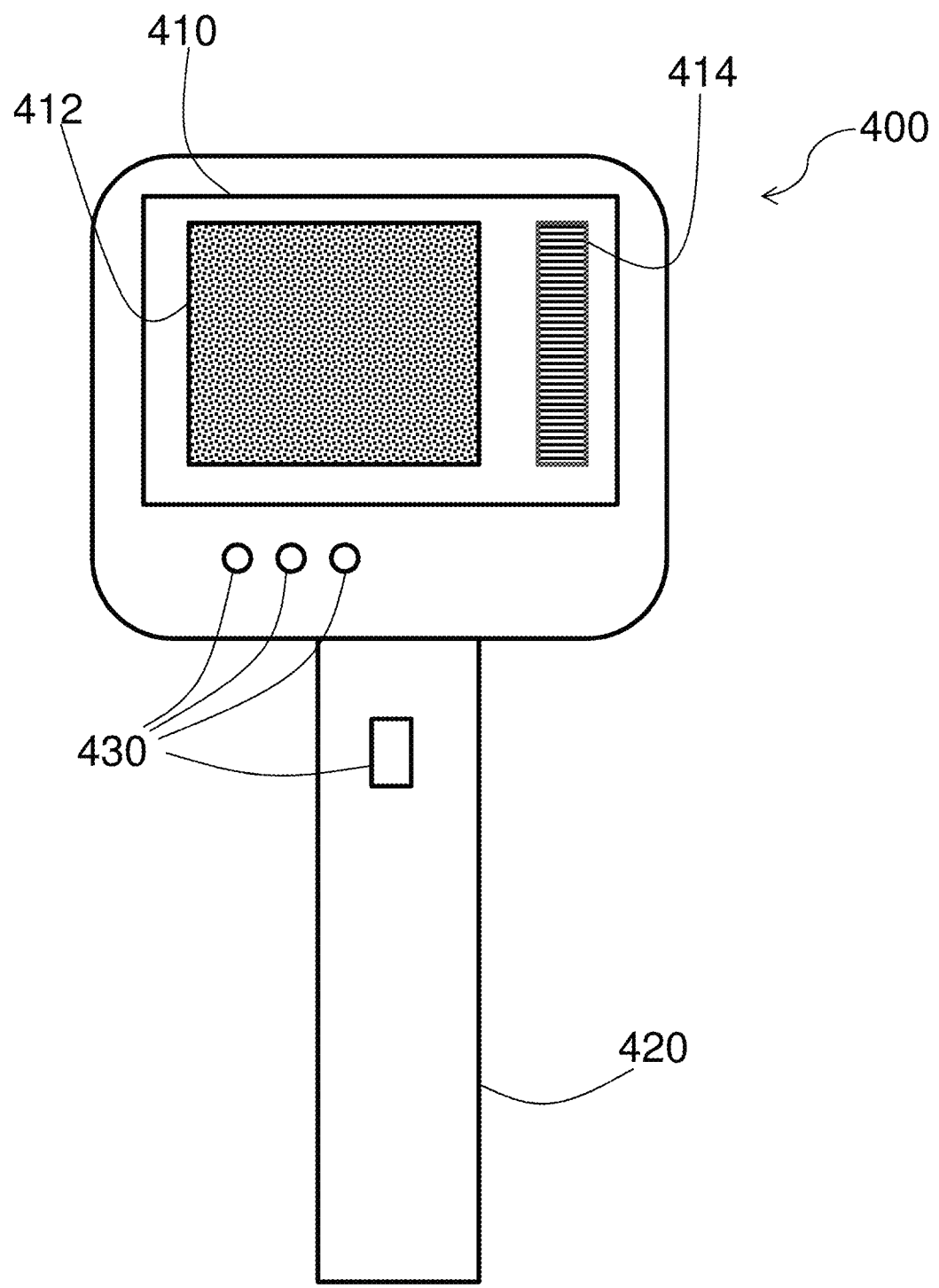
FIG. 8 shows a handheld device according to an embodiment of the invention.

FIG. 8 shows a handheld device 400, which can be used, together with one or more sensor substances, for example in one or more sensor elements, and one or more calibration areas, for example realised as one or more calibration elements, to perform the method according to the invention. The handheld device 400 has a display 410, a handle 420, and control elements 430, for example buttons. The display 410 can for example show results of measurements in text form, e.g. a text identifying a measured variable and a corresponding measurement value for the respective variable. Alternatively, the display 410 may show a spatial distribution 412 of a variable of the sample, for example obtained using a sensor element 10 as shown in FIG. 6, as e.g. a colour-coded distribution, along with a colour-scale 414, relating colours shown in the distribution 412 to values of the measured variable. Using control elements 430, the user can switch between display modes, start further measurements, or perform further functions like transmitting results to external devices or storing results in a memory. Such a handheld device 400 may, with reference to FIG. 1, include a camera 110, a control and evaluation unit 130, and optionally also light sources 120.

LIST OF REFERENCE SIGNS

1 measurement system
10 sensor element
11 sensor element
13 sensor element
15 sensor element
21 calibration area/calibration element
22 calibration area/calibration element
23 calibration area/calibration element
24 calibration area/calibration element
25 calibration area/calibration element
26 calibration area/calibration element
50 carrier
60 length scale
100 image
110 camera
111 light
120 light source
121 light
130 control and evaluation unit
200 sample
201 sample container
300 curve
301 point
302 point
303 point
304 point
305 point
310 abscissa
320 ordinate
400 handheld device
410 display
412 spatial distribution
414 colour scale
420 handle
430 control element

What is claimed is:

1. A method for calibrated measurement of at least one variable of a sample, the method comprising:
   a) establishing a contact between the sample and at least one sensor substance, each of the at least one sensor substance exhibiting an optical behaviour which is a luminescence effect, and which is dependent on at least one of the at least one variable of the sample;
   b) defining at least one calibration area associated with at least one of the at least one sensor substance by exposing a portion of the at least one of the at least one sensor substance to defined ambient conditions, wherein such defined ambient conditions include a pre-determined value of at least one of the at least one variable of the sample;

c) forming at least one recorded image, each of the at least one image capturing at least a portion of at least one of the at least one sensor substance and at least a portion of at least one of the at least one calibration area; and d) determining a value of the at least one variable of the sample from the at least one recorded image based on image data of the at least one recorded image associated with the at least one sensor substance and on image data of the at least one recorded image associated with the at least one calibration area.

2. The method according to claim 1, wherein the at least one recorded image is formed with a handheld device.

3. The method according to claim 1, wherein at least one of the at least one variable of the sample is a concentration of a substance, a partial pressure of a substance, a pH-value, a pressure, or a temperature.

4. The method according to claim 1, wherein at least one of the at least one sensor substance is provided embedded in a sensor element or attached to a surface of a sensor element, and wherein the sensor element is brought into contact with the sample.

5. The method according to claim 4, wherein the sensor element is identified in the at least one image by at least one of the following geometrical properties of the sensor element: position, size, shape.

6. The method according to claim 1, wherein the at least one of the at least one calibration area is defined by a calibration element, the calibration element having the portion of the at least one of the at least one sensor substance embedded within the calibration element or attached on a surface of the calibration element.

7. The method according to claim 1, wherein at least one of the at least one calibration area is identified in the at least one recorded image by at least one of the following geometrical properties of the calibration area: position, size, shape.

8. The method according to claim 1, wherein at least one of the at least one sensor substance and at least one of the at least one calibration area are provided on a common carrier.

9. The method according to claim 1, wherein a plurality of the recorded images is formed, and wherein at least two of the recorded images differing with respect to a wavelength region of light are recorded in said plurality of the recorded images.

10. The method according to claim 1, wherein a first image and a plurality of second images are recorded of a portion of at least one of the at least one sensor substance and of a portion of at least one of the at least one calibration area, and wherein at least one of the at least one variable of the sample is determined based on image data associated with the at least one of the at least one calibration area in the first image and on image data associated with the at least one of the at least one sensor substance in the plurality of second images or is determined based on image data associated with the at least one of the at least one calibration area in the first image and on image data associated with the at least one of the at least one sensor substance in the first image and in the plurality of second images.

11. The method according to claim 1, wherein a plurality of images are recorded of a portion of at least one of the at least one sensor substance and of a portion of at least one of the at least one calibration area, and wherein at least one of the at least one variable of the sample is determined for each image of the plurality of images based on image data associated with the at least one of the at least one calibration area and on image data associated with the at least one of the at least one sensor substance in a respective image.

12. The method according to claim 1, wherein at least a portion of at least one of the at least one sensor substance and at least a portion of at least one of the at least one calibration area are exposed to light of at least one pre-defined wavelength range in order to probe the optical behaviour of the at least one of the at least one sensor substance and/or to record at least one of the at least one image.

13. The method according to claim 1, wherein the value of at least one of the at least one variable is determined in a space-resolved manner.

* * * * *